(12) United States Patent
Suzuki et al.

(10) Patent No.: US 6,522,364 B1
(45) Date of Patent: Feb. 18, 2003

(54) CLOCK FREQUENCY GENERATOR

(75) Inventors: Takashi Suzuki, Kanagawa-ken (JP); Koichi Sato, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/384,375

(22) Filed: Aug. 27, 1999

(30) Foreign Application Priority Data

Aug. 27, 1998 (JP) ............................. 10-242174

(51) Int. Cl.⁷ .............................. H04N 5/06; H04N 5/45
(52) U.S. Cl. ....................... 348/524; 348/521
(58) Field of Search ................. 348/521, 524, 348/536, 448, 441, 553, 554, 555, 556, 500; 327/141, 144, 151; H04N 5/06, 5/45

(56) References Cited

U.S. PATENT DOCUMENTS

| | | | | |
|---|---|---|---|---|
| 4,295,157 A | * | 10/1981 | Machida et al. | 269/43 |
| 5,966,184 A | * | 10/1999 | Boehlke | 348/521 |
| 6,078,317 A | * | 6/2000 | Sawada | 345/204 |

FOREIGN PATENT DOCUMENTS

JP         5-284508        10/1993

* cited by examiner

*Primary Examiner*—Michael H. Lee
(74) *Attorney, Agent, or Firm*—Pillsbury Winthrop LLP

(57) ABSTRACT

The invention provides a clock frequency generator for the use of converting the format of the video signal, which generates a clock of an unified frequency, in order to obtain the horizontal and the vertical synchronizing signals for the video signal after the format conversion without changing the field frequency and the scanning lines of the standard video signal. By using the clock generated by multiplying by a factor of 4740 the horizontal synchronizing signal for the SD format interlace scanning signal in the first multiplier (0009) and the second multiplier (0003), the horizontal synchronizing signal for the HD format interlace scanning signal is generated from the output terminal (0007) and the vertical synchronizing signal for the HD format interlace scanning signal is generated from the output terminal (0008) without changing the standard number of the scanning lines and the field frequency.

24 Claims, 10 Drawing Sheets

CLOCK FREQUENCY GENERATOR

FIELD OF THE INVENTION

The present invention relates to a clock frequency generator for generating a clock of an unified frequency in the case of converting the format of the video signal of the television receiver, in order to obtain the horizontal and the vertical synchronizing signals for the video signal after converting the format, without changing the field frequency and the scanning lines of the standard video signal.

BACKGROUND OF THE INVENTION

Recently, in the television broadcasting the digital broadcasting service has been started besides the conventional analogue broadcasting service. In the United States, the digital broadcasting by the surface wave has been started since 1998. In Japan, a digital BS broadcast for mainly servicing a high definition video signal will start in 2000.

There are a variety of standards for signal formats which are employed for the digital television broadcast service. For instance, there are an interlace scanning system signal comprising 525 scanning lines and 858 pixels and a progressive scanning system signal comprising the same 525 scanning lines and the same 858 pixels (these two signals will be referred to SD format signals, hereinafter), a progressive scanning system signal comprising 750 scanning lines and 1650 pixels, and a progressing scanning system signal comprising 1125 scanning lines and 2200 pixels (these two signals will be referred to HD format signals, hereinafter).

In the television receiver compatible with the digital broadcasting, a display format will vary in wider ways, such as a way of supplying the various video signals as mentioned above and away of mixing the HD format signal and SD format signal, a way of displaying by using the synchronizing signal for the HD format signal, or a way of adjusting the screen size to display the graphics or character information on the free space.

In order to comply with the various display formats as mentioned above, it is necessary to convert the format of the video signals between the SD format signal and the HD format signal.

However, if it is considered the number of the scanning lines of each signal formats or the field frequencies (59.94 Hz or 60 Hz), it is difficult to convert the format of the signals as described above by using the standard value. An example of it will be shown below.

First, the horizontal synchronizing signal frequency fH and the clock signal CK of the SD format interlacing scanning signal comprised of 858 pixels and 525 scanning lines are given as follows:

$$FH(SD) = \text{(field frequency)} \times \text{(number of scanning lines in 1 field)} \quad (1)$$
$$= 59.94 \times 525/2$$
$$= 15.734 \text{ (KHz)}$$
$$CK(SD) = (1) \times \text{(number of pixels)}$$
$$= 15.734 \times 858$$
$$= 13.499 \text{ (MH)}$$

This is a case in that the field frequency is 59.94 Hz.

Next, the horizontal synchronizing signal frequency fH and the clock frequency CK of the HD format interlace scanning signal comprised of 2200 pixels and 1125 scanning lines are given as follows:

$$FH(HD) = \text{(field frequency)} \times \text{(number of scanning lines in 1 field)}$$
$$= 59.94 \times 1125/2$$
$$= 33.716 \text{ (KHz)}$$
$$CK(HD) = (2) \times \text{(number of pixels)}$$
$$= 33.716 \times 2200$$
$$= 74.175 \text{ (MHz)}$$

This is a case in that the field frequency is 59.94 Hz.

By the values of each signal formats as shown above, it is difficult to convert the format of the signal from SD format signal to HD format signal without changing the original field frequency and the number of the scanning lines. However, in the television receiver which is possible to input both SD format signal and HD format signal, it had displayed the image without converting the format of the video signal in the case of being input the HD format signal. On the other hand, in the case of being input the SD format interlace scanning signal, it had displayed the image by converting the format of the video signal into that of the SD format progressive scanning signal. Here, the conversion to the progressive scanning signal is explained in detail in the Laied-open Japanese patent Application Tokkai-Hei 4-157886.

Here, the horizontal synchronizing frequency of the SD format progressive scanning signal differs from that of the HD format signal.

That is, the horizontal synchronizing frequency of the SD format progressive scanning signal is 31.468 KHz, and that if the HD format signal is 33.716 KHz as shown in the above Equation (2). For instance, in the television receiver using the cathode ray tube, it is possible display any video signals as mentioned above by controlling the difference of the horizontal synchronizing frequency by deflection system. However, in the television receiver which does not equipped with the deflection system such as the liquid crystal projection television, it needs the video signal processing to display the images by the same horizontal frequency.

In the conventional television receiver which converts the format of the video signal, it was needed a generator for generating a clock in order to obtain the video signal field frequency and the scanning lines which comply with every formats.

SUMMARY OF THE INVENTION

So, the present invention has an object to provide the clock frequency generator for generating a clock of an unified frequency, so as to obtain the horizontal and the vertical synchronizing signals for the video signal after converting the format without changing the field frequency and the number of the scanning lines of the standard video signal.

According to a first aspect of the present invention, a clock frequency generator for a television receiver capable of converting a signal format from that of an interlace scanning signal comprising 525 scanning lines into that comprising 1125 scanning lines, comprising:

- a multiplier for multiplying by a factor of 4740 a horizontal synchronizing signal for the interlace scanning signal comprising 525 scanning lines;
- a frequency divider for dividing by a factor of 2212 the frequency of the signal obtained in the multiplier, in order to obtain a horizontal synchronizing signal for the interlace scanning signal comprising 1125 scanning lines; and
- a clock generator for generating a clock which is used for generating the horizontal and the vertical synchronizing signals for the interlace scanning signal comprising 1125 scanning lines from the horizontal synchronizing signal for the interlace scanning signal comprising 525 scanning lines in the multiplier.

According to a second aspect of the present invention, a clock frequency generator for a television receiver capable of converting a signal format from that of an interlace scanning signal comprising 525 scanning lines into a progressive scanning signal comprising 750 scanning lines, comprising:

- a multiplier for multiplying by a factor of 4740 a horizontal synchronizing signal for the interlace scanning signal comprising 525 scanning lines;
- a frequency divider for dividing by a factor of 659 the frequency of the signal obtained in the multiplier, in order to obtain a horizontal synchronizing signal for the progressive scanning signal comprising 750 scanning lines; and
- a clock generator for generating a clock which is used for generating the horizontal and the vertical synchronizing signals for the progressive scanning signal comprising 750 scanning lines from the horizontal synchronizing signal for the interlace scanning signal comprising 525 scanning lines in the multiplier.

According to a third aspect of the present invention, a clock frequency generator for a television receiver capable of converting a signal format from that of a progressive scanning signal comprising 525 scanning lines into an interlace scanning signal comprising 1125 scanning lines, comprising:

- a multiplier for multiplying by a factor of 2370 a horizontal synchronizing signal for the progressive scanning signal comprising 525 scanning lines;
- a vertical synchronizing signal generator for generating a vertical synchronizing signal for the interlace scanning signal comprising 1125 scanning lines from a vertical synchronizing signal for the interlace scanning signal comprising 525 scanning lines and the signal obtained in the multiplier;
- a frequency divider for dividing by a factor of 2212 the frequency of the signal obtained in the multiplier, in order to obtain a horizontal synchronizing signal for the interlace scanning signal comprising 1125 scanning lines; and
- a clock generator for generating a clock which is used for generating the horizontal and the vertical synchronizing signals for the interlace scanning signal comprising 1125 scanning lines from the horizontal synchronizing signal for the progressive scanning signal comprising 525 scanning lines in the multiplier.

According to a fourth aspect of the present invention, a clock frequency generator for a television receiver capable of converting a signal format from that of a progressive scanning signal comprising 525 scanning lines into that of 750 scanning lines, comprising:

- a multiplier for multiplying by a factor of 2370 a horizontal synchronizing signal for the progressive scanning signal comprising 525 scanning lines;
- a frequency divider for dividing by a factor of 1659 the frequency of the signal obtained in the multiplier, in order to obtain a horizontal synchronizing signal for the progressive scanning signal comprising 750 scanning lines; and
- a clock generator for generating a clock which is used for generating the horizontal and the vertical synchronizing signals for the progressive scanning signal comprising 750 scanning lines from the horizontal synchronizing signal for the progressive scanning signal comprising 525 scanning lines in the multiplier.

According to a fifth aspect of the present invention, a clock frequency generator for a television receiver capable of converting a signal format from that of an interlace scanning signal comprising 525 scanning lines into that comprising 1125 scanning lines, comprising:

- a multiplier for multiplying by a factor of 2212 a horizontal synchronizing signal for the interlace scanning signal comprising 1125 scanning lines;
- a first frequency divider for dividing by a factor of 5/2 the frequency of the signal obtained in the multiplier;
- a second frequency divider for further dividing by a factor of 948 the frequency of the signal obtained in the first frequency divider in order to obtain a horizontal synchronizing signal for the progressive scanning signal comprising 525 scanning lines; and
- a clock generator for generating a clock which is used for generating the horizontal and the vertical synchronizing signals for the interlace scanning signal comprising 525 scanning lines from the horizontal synchronizing signal for the interlace scanning signal comprising 1125 scanning lines in the first frequency divider.

According to a sixth aspect of the present invention, a clock frequency generator for a television receiver capable of converting a signal format from that of a progressive scanning signal comprising 525 scanning lines into an interlace scanning signal comprising 525 scanning lines, comprising:

- a multiplier for multiplying by a factor of 2212 a horizontal synchronizing signal for the interlace scanning signal comprising 1125 scanning lines;
- a frequency divider for dividing by a factor of 4740 the frequency of the signal obtained in the multiplier in order to obtain a horizontal synchronizing signal for the progressive scanning signal comprising 525 scanning lines; and
- a clock generator for generating a clock which is used for generating the horizontal and the vertical synchronizing signals for the progressive scanning signal comprising 525 scanning lines from the horizontal synchronizing signal for the interlace scanning signal comprising 1125 scanning lines in the frequency divider.

According to a seventh aspect of the present invention, a clock frequency generator for a television receiver capable of converting a signal format from that of a progressive scanning signal comprising 750 scanning lines into a interlace scanning signal of the 525 scanning lines, comprising:

a multiplier for multiplying by a factor of 1659/5 a horizontal synchronizing signal for the progressive scanning signal comprising 750 scanning lines;

a frequency divider for dividing by a factor of 4740 the frequency of the signal obtained in the multiplier in order to obtain a horizontal synchronizing signal for the interlace scanning signal comprising 525 scanning lines; and a clock generator for generating a clock which is used for generating the horizontal and the vertical synchronizing signals for the interlace scanning signal comprising 525 scanning lines from the horizontal synchronizing signal for the interlace scanning signal comprising 750 scanning lines in the frequency divider.

According to an eighth aspect of the present invention, a clock frequency generator for a television receiver capable of converting a signal format from that of a progressive scanning signal comprising 750 scanning lines into that comprising 525 scanning lines, comprising:

a multiplier for multiplying by a factor of 1659 a horizontal synchronizing signal for the progressive scanning signal comprising 750 scanning lines;

a frequency divider for dividing by a factor of 2370 the frequency of the signal obtained in the multiplier in order to obtain a horizontal synchronizing signal for the progressive scanning signal comprising 525 scanning lines; and a clock generator for generating a clock which is used for generating the horizontal and the vertical synchronizing signals for the progressive scanning signal comprising 525 scanning lines from the horizontal synchronizing signal for the progressive scanning signal comprising 750 scanning lines in the frequency divider According to each of the first to eighth aspects of the present invention, the clock frequency generator for the television receiver capable of converting the format of the video signal is possible to generate the clock of the unified frequency to obtain the horizontal and the vertical synchronizing signals after converting the format, without changing the field frequency or the number of the scanning lines of the standard video signal.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Some embodiments of the present invention will be explained hereinafter in reference to the drawings.

(First Embodiment)

Figure 1:
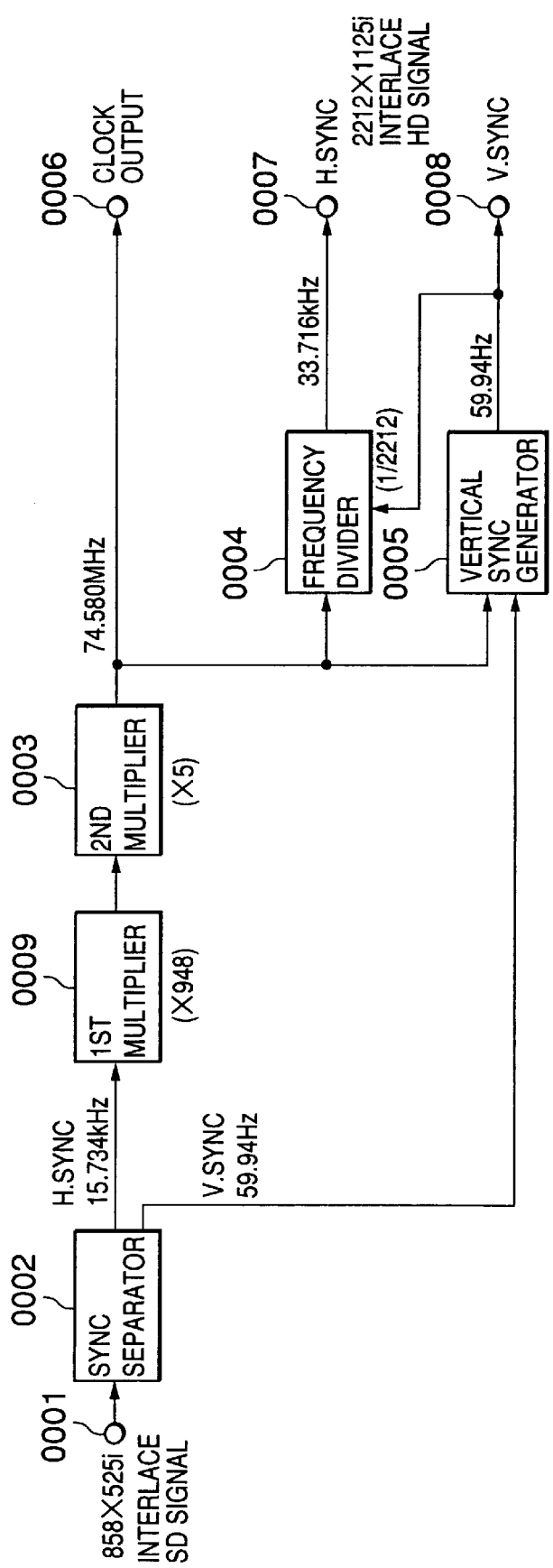
FIG. 1 is a circuit diagram for explaining the first embodiment of the present invention.

FIG. 1 is a circuit diagram for explaining the first embodiment of the present invention. This embodiment shows the case that the format is converted from that of the SD format interlace scanning signal into that of the HD format interlace scanning signal.

In FIG. 1, an interlace scanning signal comprising 525 scanning lines, 858 pixels and 59.94 Hz field frequency is supplied to a sync separator 0002 through an input terminal 0001. In the sync separator 0002, the horizontal synchronizing signal and the vertical synchronizing signal are separated from the input video signal. The 15.734 KHz horizontal synchronizing signal separated in the sync separator 0002 is supplied to a vertical synchronizing signal generator 0005 via a first multiplier 0009 and a second multiplier 0003 which also serves as a vertical synchronizing signal generator. And, the vertical synchronizing signal separated from the video signal is supplied to the vertical synchronizing signal generator 0005.

In the first multiplier 0009, the horizontal synchronizing signal for 15.734 KHz is multiplied by a factor of 948. In the second multiplier 0003, the horizontal synchronizing signal which is multiplied by a factor of 948 is multiplied further by a factor of 5 so as to generate the clock of 74.580 MHz frequency, then it is output to a frequency divider 0004 and an output terminal 0006. As a result, the horizontal synchronizing signal is finally multiplied by a factor of 4740.

Figure 2:
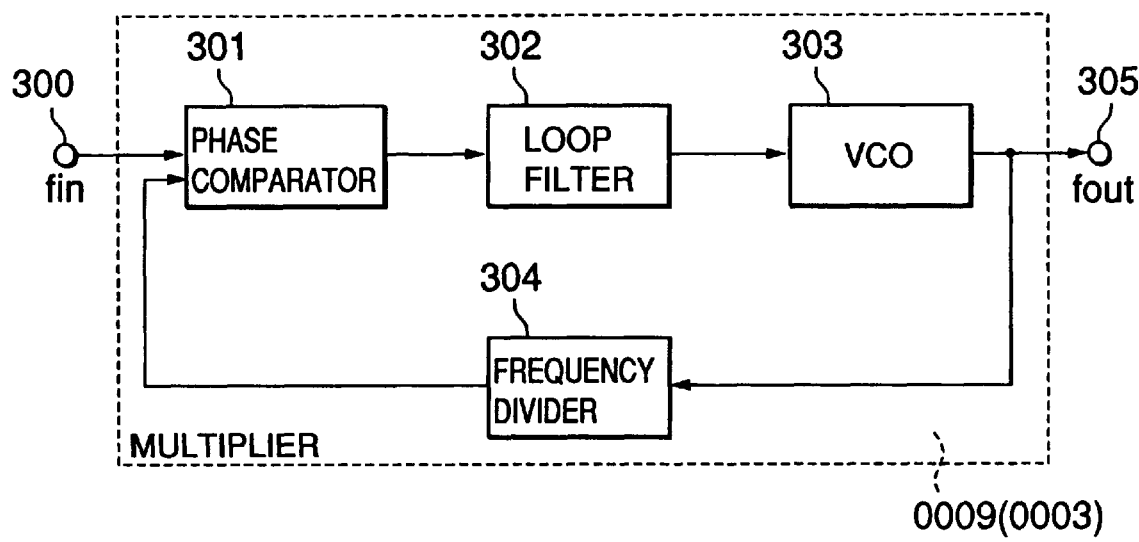
FIG. 2 is a circuit diagram for explaining the concrete configuration of the multiplier as shown in FIG. 1.

FIG. 2 shows the more concrete configuration of the first multiplier 0009. The horizontal synchronizing signal separated in the sync separator 0002 is supplied to one input terminal of a phase comparator 301 via an input terminal 300. The signal obtained in the phase comparator 301 is supplied to a voltage controlled oscillator 303 which also serves as a vertical synchronizing signal generator via a loop filter 302. The signal obtained in the voltage controlled oscillator 303 becomes a signal obtained in the multiplier 0003 via an output terminal 305, at the same time it is supplied to a frequency divided 304. In the frequency divider 304 the frequency of the signal obtained in the voltage controlled oscillator 303 is divided by a factor of 948, then it is supplied to the other input terminal of the phase comparator 301.

Since the second multiplier 0003 has the configuration same as the first multiplier 0009, the detailed explanations are omitted. But, in the second multiplier 0003, since the signal obtained in the first multiplier is multiplied by a factor of 5, the frequency of the signal is divided by a factor of 5 in the frequency divider 304.

The circuit comprised of the phase comparator 301, the loop filter 302, the voltage controlled oscillator 303 and the frequency divider 304 is called a phase locked loop (hereinafter referred to as a PLL; Phase Locked Loop), which operates to detect a phase difference and suppress the difference so as to result a signal with the phase and the frequency the same as those of the input signal and controls the output signal frequency by the feedback.

The phase comparator 301 generates the output voltage corresponding to the phase difference of each input signal. The loop filter 302 receives the signal obtained in the phase comparator 301, and based on its amplitude and the phase character it decides the PLL reply character and the synchronizing character. And, the voltage controlled oscillator 303 decides the oscillating frequency according to the control signal voltage that is the signal obtained in the loop filter 3002. Further, the PLL is controlled the frequency of its output signal by the ratio for dividing the frequency of the output signal in the voltage controlled oscillator.

The vertical synchronizing signal generator 0005 generates the vertical synchronizing signal corresponding to the signal format after the conversion based on the vertical synchronizing signal output from the sync separator 0002 and the signal obtained in the second multiplier 0003, then the vertical synchronizing signal is output to the frequency divider 0004 and the output terminal 0008.

The frequency divider 0004 divides by a factor of 2212 the clock frequency which is output from the multiplier 0003 by the signal output from the vertical synchronizing signal generator 0005 as its standard, and generates the horizontal synchronizing signal for 33.716 KHz corresponding to the signal format after the conversion and outputs the signal through the output terminal 0007.

Figure 3:
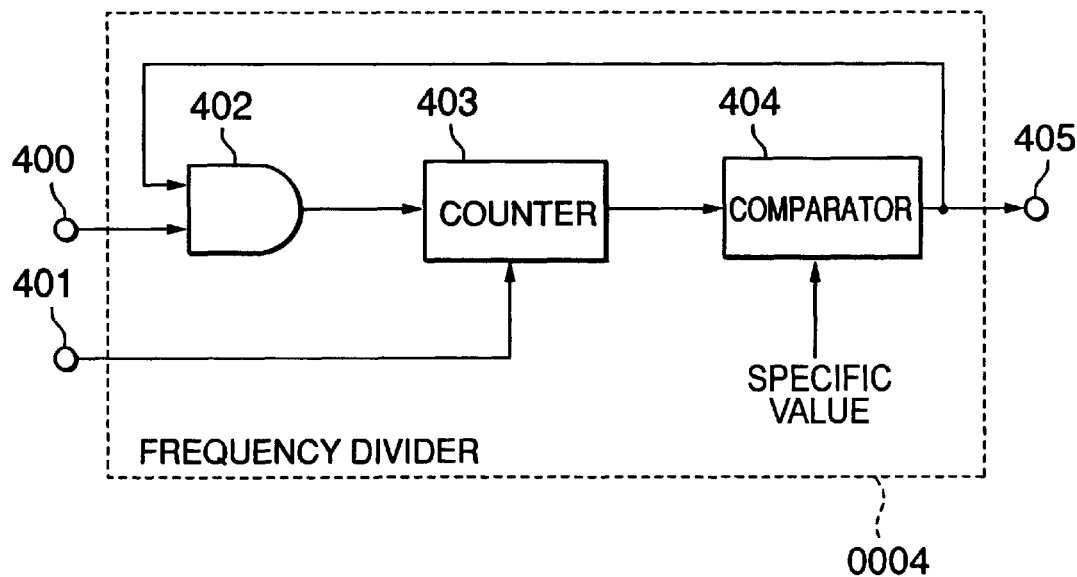
FIG. 3 is a circuit diagram for explaining the concrete configuration of the frequency divider as shown in FIG. 1.

The detail configuration of the frequency divider 0004 is shown in FIG. 3. The vertical synchronizing signal from the vertical synchronizing signal generator 0005 input to an input terminal 400 is supplied to one input terminal of an AND gate 402. The signal obtained in the AND gate 402 is supplied to an input terminal for clear of a counter 403. The counter 403, which clear the signal when the signal input to the input terminal for the clear is L format, performs the counter operation by synchronizing the rising edge of the clock by the signal obtained in the multiplier 0003 input to via the input terminal 401 as the clock of the counter 403.

The signal obtained in the counter 403 is supplied to one input terminal of the comparator 404 and compared to a specific value input from the other input terminal of the comparator 404. In the case that it corresponds to the specific value the L format signal is output, and in the case of that it does not correspond to the specific value the H format signal is output to the output terminal 405 and the other input terminal of the AND gate 402. The AND gate 402 takes the logic product of the vertical synchronizing signal input from the input terminal 400 and the compared result of the comparator 404 and supplies it to the input terminal for clear of the counter 403.

In this embodiment as described above, since it divides by a factor of 2212 the frequency of the signal obtained in the second multiplier 0003 by the frequency divider 0004 the specific value input to the comparator 404 becomes 2212.

As described above, by using the clock multiplied by a factor of 4740 the horizontal synchronizing signal for the SD format interlace scanning signal in the first multiplier 0009 and the second multiplier 0003, it can generate the horizontal and the vertical synchronizing signals for the HD format interlace scanning signal without changing the standard number of the scanning lines and the field frequency.

(Second Embodiment)

Figure 4:
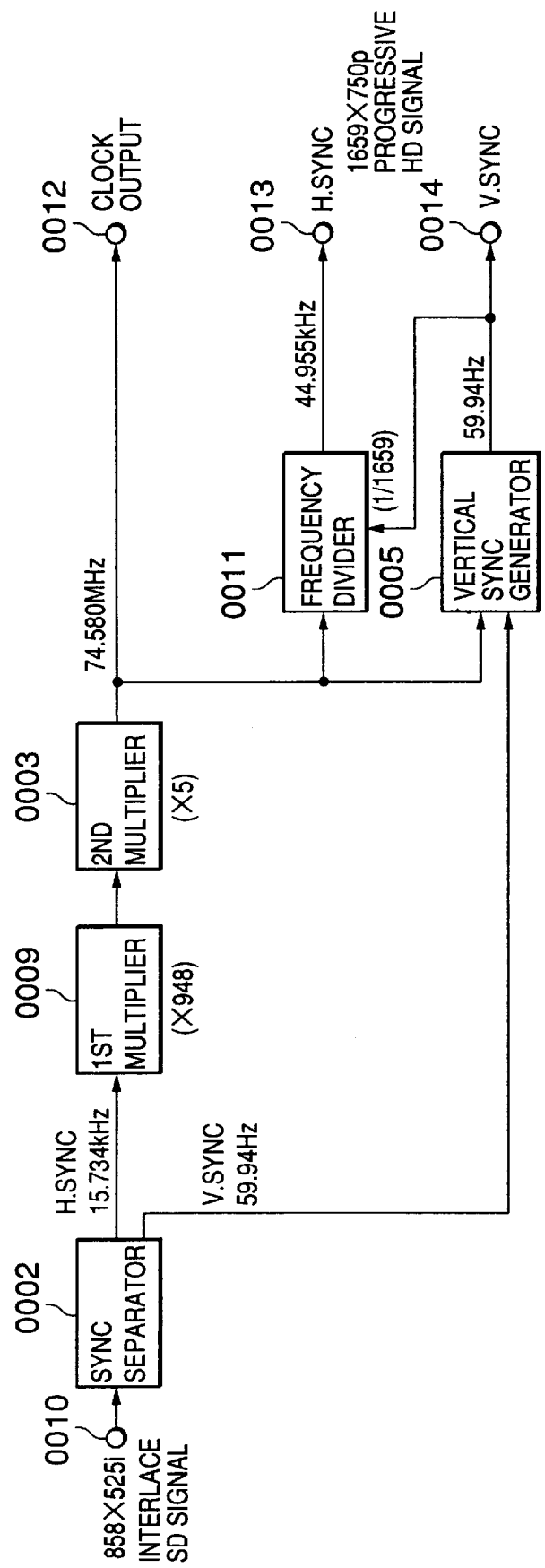
FIG. 4 is a circuit diagram for explaining the second embodiment of the present invention.

The second embodiment of the present invention will be explained in reference to the circuit diagram, as shown in FIG. 4. In this embodiment, the format is converted from that of the SD format interlace scanning signal into that of the HD format progressive scanning signal. Here, the same components as those as shown in FIG. 1 are assigned with same marks and omitted those explanations.

The interlace scanning signal comprising 525 scanning lines, 858 pixels, and 59.94 Hz field frequency input from the input terminal 0010 is supplied to the sync separator 0002. The sync separator 0002 separates the horizontal synchronizing signal and the vertical synchronizing signal from the input video signal. The horizontal synchronizing signal for 15.734 KHz separated in the sync separator 0002 is supplied to the vertical synchronizing signal generator 0005 via the first multiplier 0009 and the second multiplier 0003. The vertical synchronizing signal separated in the same way is also supplied to the vertical synchronizing signal generator 0005.

In the first multiplier 0009, the 15.734 KHz horizontal synchronizing signal is multiplied by a factor of 948. In the second multiplier 0003, the signal obtained in the first multiplier 0009 is multiplied further by a factor of 5 so as to generate the clock of 74.580 MHz frequency, which is output to the frequency divider 0011 and the output terminal 0012. As a result, the horizontal synchronizing signal is finally multiplied by a factor of 4740.

In the vertical synchronizing signal generator 0005, the vertical synchronizing signal which is corresponding to the signal format after the conversion is generated from the vertical synchronizing signal output from the sync separator 0002 and the signal obtained in the second multiplier 0003, then the vertical synchronizing signal is output to the frequency divider 0011 and the output terminal 0014.

The frequency divider 0011 divides by a factor of 659 the frequency of the clock output from the second multiplier 0003 based on the signal output from the vertical synchronizing signal generator 0005, and generates the horizontal synchronizing signal for 44.955 KHz which is corresponding to the signal format after the conversion, so as to output the generated signal through the output terminal 0013.

The frequency divider 0011 has the configuration basically same as the frequency divider 0004 as shown in FIG. 1 but partially modified, and the explanation is omitted here. But since the frequency divider 0011 of this embodiment divides by a factor of 1659 the frequency of the signal obtained in the second multiplier 0003 the specific value input to one input terminal of the comparator 404 in the frequency divider as shown in FIG. 3 becomes 1659.

As described above, by using the clock multiplied by that is generated by a factor of 4740 the horizontal synchronizing signal for the SD format interlace scanning signal in the first multiplier 0009 and the second multiplier 0003, the horizontal and the vertical synchronizing signals of the HD format progressive scanning signal can be generated without changing the standard number of the scanning lines and the field frequency.

Further, as shown in the first and the second embodiments, in the case of converting the format from that of the SD format interlace scanning signal into that of the HD format interlace scanning or progressive scanning signal, it is possible to generate the horizontal and the vertical synchronizing signals which are corresponding to any HD format signal by using the unified clock multiplied by a factor of 4740 the horizontal synchronizing signal for the SD format interlace scanning signal in the multiplier 0003.

(Third Embodiment)

Figure 5:
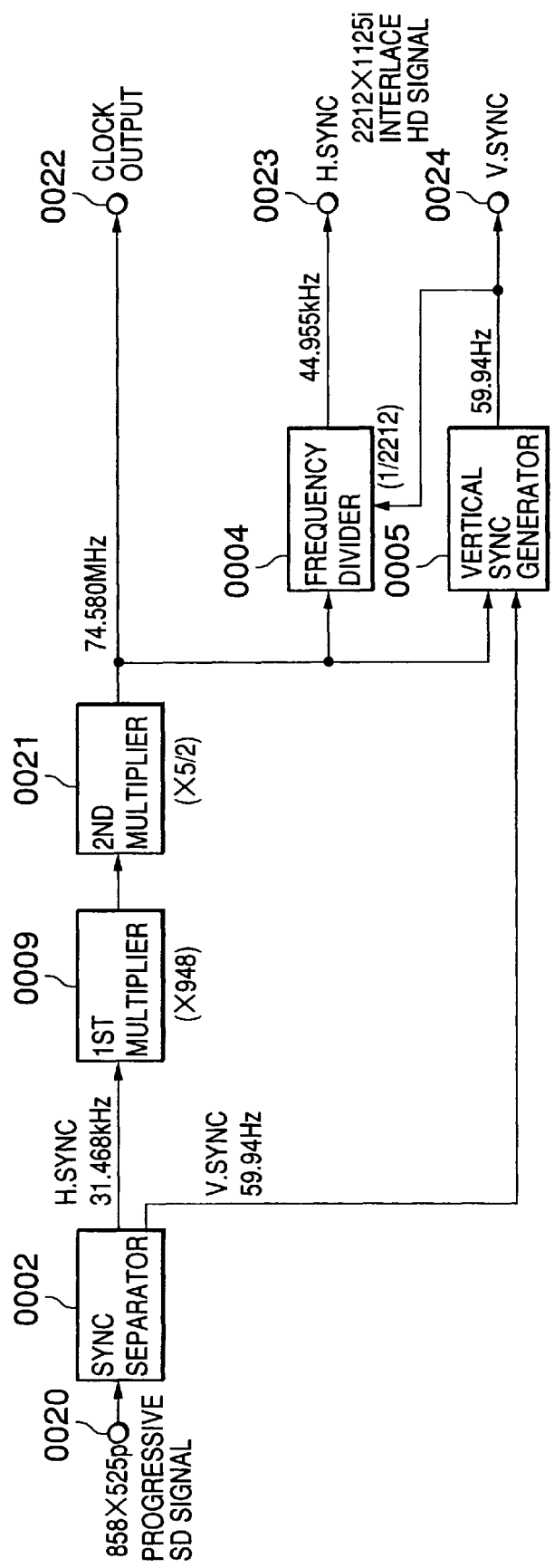
FIG. 5 is a circuit diagram for explaining the third embodiment of the present invention.

FIG. 5 is a circuit diagram for explaining the third embodiment of the present invention. In this embodiment, the format is converted from that of the SD format progressive scanning signal into that of the HD format interlace scanning signal. Here, the same components as those as shown in FIG. 4 are assigned with same marks and omitted the explanation.

The progressive scanning signal comprising 525 scanning lines, 858 pixels, and 59.94 Hz field frequency input from the input terminal 0020 is supplied to the sync separator 0002. The sync separator 0002 separates the horizontal synchronizing signal and the vertical synchronizing signal from the input video signal. The horizontal synchronizing signal for 31.468 KHz which is separated from the video signal in the sync separator 0002 is supplied to the vertical synchronizing signal generator 0005 via the first multiplier 0009 and the second multiplier 0021. The vertical synchronizing signal which is separated in the same way from the video signal is also supplied to the vertical synchronizing signal generator 0005.

In the first multiplier 0009, the horizontal synchronizing signal for 31.468 KHz is multiplied by a factor of 948. In the second multiplier 0021, the clock obtained by the first multiplier 0009 is further multiplied by a factor of 5/2 in order to generate the clock of 74.580 MHz frequency so as to be output to the frequency divider 0004 and the output terminal 0022. As a result, the horizontal synchronizing signal is finally multiplied by a factor of 2370.

Figure 6:
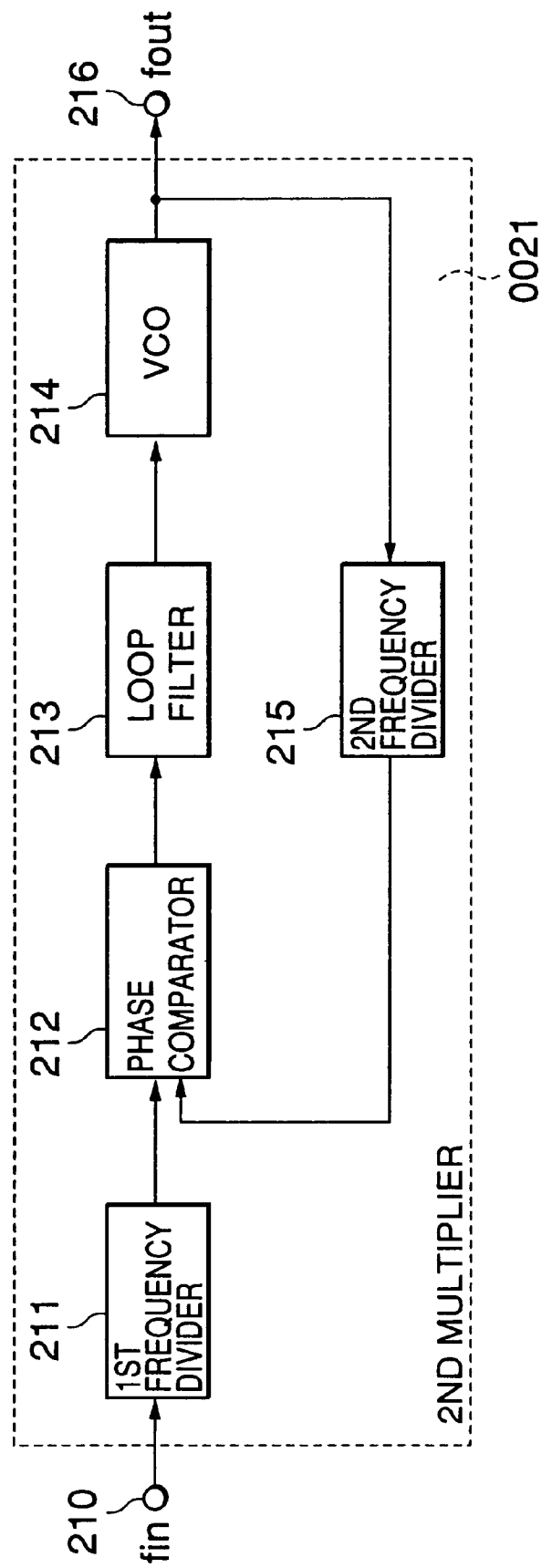
FIG. 6 is a circuit diagram for explaining the concrete configuration of the second multiplier as shown in FIG. 5.

FIG. 6 shows the configuration of the second multiplier 0021. The horizontal synchronizing signal separated from the video signal in the sync separator 0002 is supplied to the first frequency divider 211 via the input terminal 210. The signal divided by a factor of 2 by the frequency of the output from the first frequency divider 211 is supplied to one input terminal of the phase comparator 212. The signal obtained in the phase comparator 212 is supplied to the voltage controlled oscillator 214 via the loop filter 213. The signal obtained in the voltage controlled oscillator 214 becomes the signal obtained in the second multiplier 0021 via the output terminal 216, at the same time it is supplied to the second frequency divider 215. The second frequency divider 215 divides by a factor of 5 the frequency of the signal obtained in the voltage controlled oscillator 214, and supplies it to the other input terminal of the phase comparator 212.

In the configuration of the second multiplier 0021 as shown in FIG. 6, the configuration of the phase comparator 212, the loop filter 213, the voltage controlled oscillator 214, and the second frequency divider 215 is the PLL configuration explained in FIG. 1. In this embodiment, by using the clock multiplied by a factor of 5/2 the frequency of the signal obtained in the first multiplier 0009, the horizontal and the vertical synchronizing signals corresponding to the video signal after the format conversion are generated. Accordingly, in the second multiplier 0021, the frequency of the signal obtained in the fist multiplier 0009 is divided by a factor of 2 and then multiplied by a factor of 5 through a PLL, so that the 5/2-multiplication is carried out.

Here, the signal multiplied by a factor of 5/2 the frequency of the signal obtained in the first multiplier 0009 can also be obtained by multiplying by a factor of 5 the frequency of the signal via the PLL first and then divided by a factor of 2 the resulted frequency of the signal.

In the vertical synchronizing signal generator 0005, the vertical synchronizing signal corresponding to the signal format after the conversion is generated based on the vertical synchronizing signal output from the sync separator 0002 and the signal obtained in the second multiplier 0021, and the generated signal is output to the frequency divider 0005 and the output terminal 0024.

In the frequency divider 0004, based on the vertical synchronizing signal generated in the vertical synchronizing signal generator 0005, the horizontal synchronizing signal for 33.716 KHz corresponding to the signal format after the conversion is generated by dividing by a factor of 2212 the frequency of the clock output from the second multiplier 0021, and output to the output terminal 0023.

As mentioned above, by using the clock obtained by multiplying by a factor of 4740/2 the horizontal synchronizing signal for the SD format progressive scanning signal in the first frequency divider 0009 and the second frequency divider 0021, the horizontal and the vertical synchronizing signals of the HD format interlace scanning signal are generated without changing the standard number of the scanning lines and the field frequency.

(Fourth Embodiment)

Figure 7:
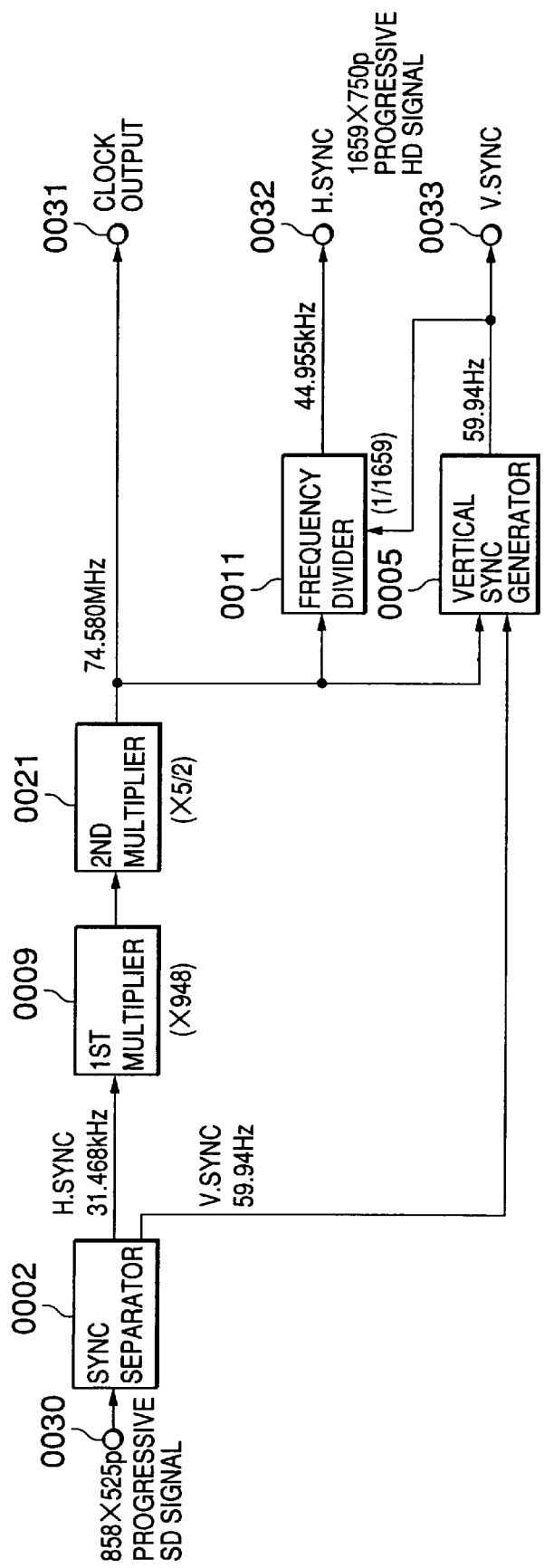
FIG. 7 is a circuit diagram for explaining the fourth embodiment of the present invention.

The fourth embodiment is explained in the circuit diagram of FIG. 7. In this embodiment, the format is converted from that of the SD format progressive scanning signal into that of the HD format progressive scanning signal. Here, the same components which are as those as shown in other embodiments are assigned with same marks, and those explanations are omitted.

The progressive scanning signal comprising 525 scanning lines, 858 pixels, and 59.94 Hz field frequency which is input from the input terminal 0030 is supplied to the sync separator 0002. In the sync separator 0002, the horizontal synchronizing signal and the vertical synchronizing signal are separated from the input video signal. The horizontal synchronizing signal for 31.468 KHz which is separated from the video signal in the sync separator 0002 is supplied to the vertical synchronizing signal generator 0005 via the first and the second multipliers 0009 and 0021. The vertical synchronizing signal for 59.94 Hz which is separated from the video signal in the sync separator 0002 is also supplied to the vertical synchronizing signal generator 0005.

In the first multiplier 0009, the horizontal synchronizing signal for 31.468 KHz is multiplied by a factor of 948. In the second multiplier 0021, the clock of 74.580 MHz is generated by multiplying by a factor of 5/2 the output from the first multiplier 0009 and output to the frequency divider 0011 and the output terminal 0031. As a result, the horizontal synchronizing signal is finally multiplied by a factor of 2370.

In the vertical synchronizing signal generator 0005, the vertical synchronizing signal corresponding to the signal format after the conversion is generated based on the vertical synchronizing signal output from the sync separator 0002 and the signal obtained in the second multiplier 0021, and output to the frequency divider 0011 and the output terminal 0033.

In the frequency divider 0011, the horizontal synchronizing signal for 44.955 KHz corresponding to the signal format after the conversion is generated by dividing by a factor of 1659 the frequency of the clock output from the second multiplier 0021, based on the signal output from the vertical synchronizing signal generator 0005, and output to the output terminal 0032.

As described above, by using the clock which is generated by multiplying by a factor of 4740/2 the horizontal synchronizing signal for the SD format progressive scanning signal in the first and second multipliers 0009 and 0021, the horizontal and the vertical synchronizing signals of the HD format progressive scanning signal are generated without changing the standard number of the scanning lines and the 59.94 Hz field frequency.

Here, as explained in the embodiments as shown in FIG. 5 and FIG. 7, in the case of format conversion from that of the SD format progressive scanning signal into that of the HD format progressive scanning signal, it is possible to generate the horizontal and the vertical synchronizing signals corresponding to any HD format signal by using the unified clock which is generated by multiplying by a factor of 4740/2 the horizontal synchronizing signal for the SD format progressive scanning signal in the first and the second multipliers 0009 and 0021.

(Fifth Embodiment)

Figure 8:
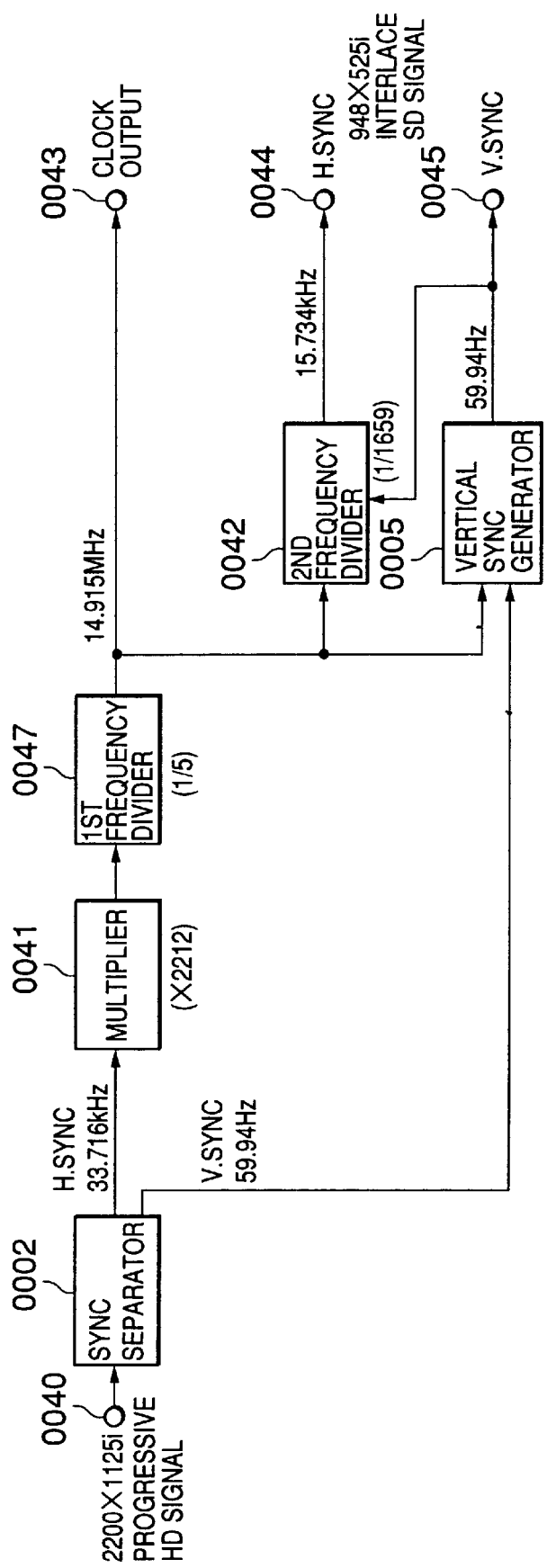
FIG. 8 is a circuit diagram for explaining the fifth embodiment of the present invention.

FIG. 8 is a circuit diagram for explaining the fifth embodiment of the present invention. In this embodiment, the format is converted from that of the HD format interlace scanning signal into that of the SD format interlace scanning signal. Here, the same components as those as shown in other embodiments are assigned with same marks, and those explanations are omitted.

The progressive scanning signal comprising 1125 scanning lines, 2200 pixels, and 59.94 Hz field frequency which is input from the input terminal 0040 is supplied to the sync separator 0002. In the sync separator 0002, the horizontal synchronizing signal and the vertical synchronizing signal are divided from the input video signal. The horizontal synchronizing signal for 33.716 KHz which is separated from the video signal in the sync separator 0002 is supplied to the vertical synchronizing signal generator 0005 via the multiplier 0041 and the first frequency divider 0047. The vertical synchronizing signal for 59.94 Hz which is separated from the video signal in the sync separator 0002 is also supplied to the vertical synchronizing signal generator 0005.

In the multiplier 0041, the horizontal synchronizing signal for 33.716 KHz is multiplied by a factor of 2212. In the first frequency divider 0047, the clock of 14.915 MHz frequency which is generated by dividing by a factor of 5 the frequency of the output from the multiplier 0041, and output to the second frequency divider 0042 and the output terminal 0043.

Since the configuration of the multiplier 0041 is basically same as one of the first multiplier 0009 as shown in FIG. 2, the explanation is omitted. But, in this embodiment, in order to multiplying by a factor of 2212 the horizontal synchronizing signal separated from the video signal in the sync separator 0002 the frequency of the signal is divided by a factor of 2212 in the frequency divider 304. That is, the horizontal synchronizing signal separated in the sync separator 0002 is multiplied by a factor of 2212 in the PLL.

In the vertical synchronizing signal generator 0005 the vertical synchronizing signal corresponding to the signal format after the conversion is generated based on the vertical synchronizing signal output from the sync separator 0002 and the signal obtained in the multiplier 0041, and output to the second frequency divider 0042 and the output terminal 0045.

In the second frequency divider 0042, the horizontal synchronizing signal for 15.734 KHz corresponding to the signal format after the conversion is generated by dividing by a factor of 948 the frequency of the clock output from the multiplier 0041, and output to the output terminal 0044. Accordingly, the horizontal synchronizing signal previously multiplied by a factor of 2212 is divided by a factor of 4740 through a combination of the first frequency divider 0047 and the second frequency divider 0042 to finally result the interlace scanning signal comprising 525 scanning lines.

Since the configuration of the second frequency divider 0042 is basically same as one of the frequency divider 0004 as shown in FIG. 1 but partially modified. Here, in the second frequency divider 0042 in this embodiment, since the frequency of the signal obtained in the first frequency divider 0047 is divided by a factor of 948, the specific value input to one input terminal of the comparator 494 becomes 948 in the configuration as shown in FIG. 4.

As described above, by using the clock which is generated by multiplying by a factor of 2212/5 the horizontal synchronizing signal for the HD format interlace scanning signal in the multiplier 0041 and the first frequency divider 0047, the horizontal and the vertical synchronizing signals of the SD format interlace scanning signal are generated without changing the standard number of the scanning lines and the field frequency.

(Sixth Embodiment)

Figure 9:
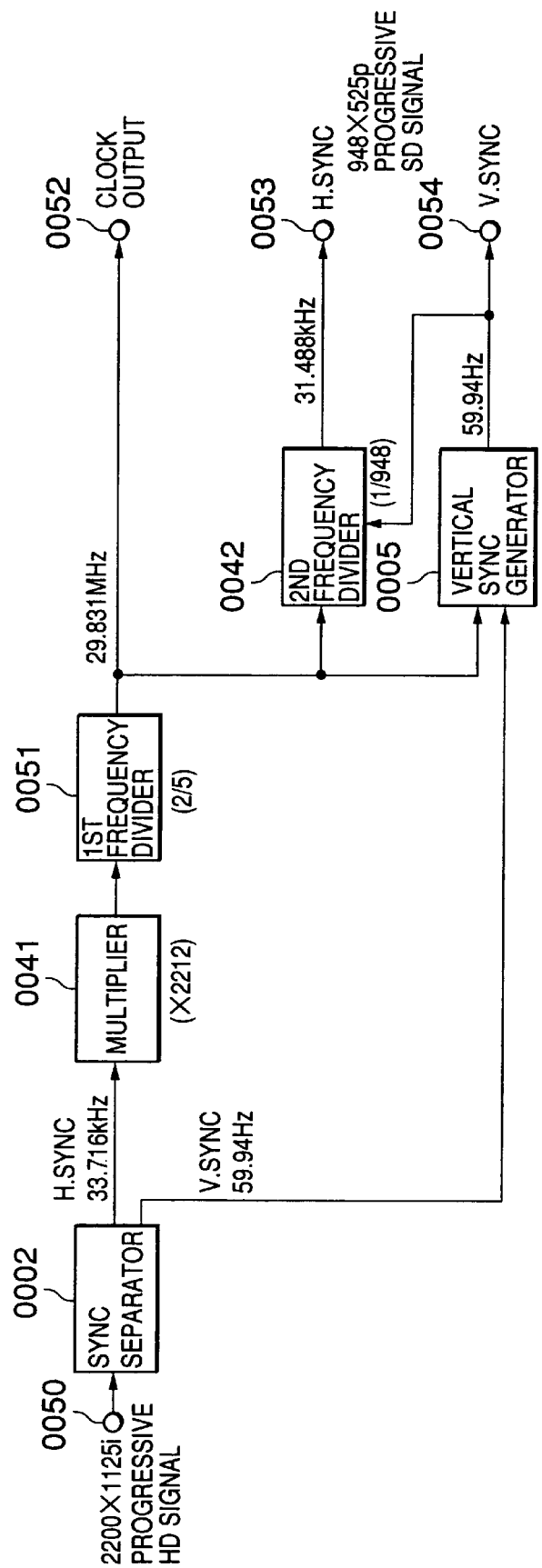
FIG. 9 is a circuit diagram for explaining the sixth embodiment of the present invention.

FIG. 9 shows a circuit illustrating the sixth embodiment. In this embodiment, the format is converted from that of the HD format interlace scanning signal into that of the SD format progressive scanning signal. The same components as those as shown in other embodiment are assigned with same marks and those explanations are omitted.

The progressive scanning signal comprising 1125 scanning lines, 2200 pixels, and 59.94 Hz field frequency input from the input terminal 0050 is supplied to the sync separator 0002. In the sync separator 0002, the horizontal synchronizing signal and the vertical synchronizing signal are separated from the video input video signal. The horizontal synchronizing signal for 33.716 KHz separated from the video signal in the sync separator 0002 is supplied to the vertical synchronizing signal generator 0005 via the multiplier 0041 and the first frequency divider 0051. The vertical synchronizing signal separated from the video signal in the sync separator 0002 is also supplied to the vertical synchronizing signal generator 0005.

In the multiplier 0041, the horizontal synchronizing signal for 33.716 KHz is multiplied by a factor of 2212. In the first frequency divider, the clock of the 29.831 MHz is generated by dividing by a factor of 5/2 the frequency of the signal obtained in the multiplier 0041, and output to the frequency divider 0042 and the output terminal 0005.

In the vertical synchronizing signal generator 0005, the vertical synchronizing signal corresponding to the signal format after the conversion is generated based on the vertical synchronizing signal output from the sync separator 0002 and the first frequency divider 0051, and output to the second frequency divider 0042 and the output terminal 0054.

In the second frequency divider 0042, the horizontal synchronizing signal for 31.468 KHz corresponding to the signal format after the conversion is generated by dividing by a factor of 948 the frequency of the clock output from the first frequency divider 0061 based on the signal output from the vertical synchronizing signal generator 0005, and output to the output terminal 0053. Accordingly, the horizontal synchronizing signal previously multiplied by a factor of 5530 is divided by a factor of 4740 through a combination of the first frequency divider 0051 and the second frequency divider 0042 to finally result the progressive scanning signal comprising 525 scanning lines.

As described above, by using the clock generated by multiplying by a factor of 4424/5 the horizontal synchronizing signal for the HD format interlace scanning signal in the multiplier 0041 and the first frequency divider 0051, the horizontal and the vertical synchronizing signals of the SD format progressive scanning signal are generated without changing the standard scanning lines and the field frequency.

(Seventh Embodiment)

Figure 10:
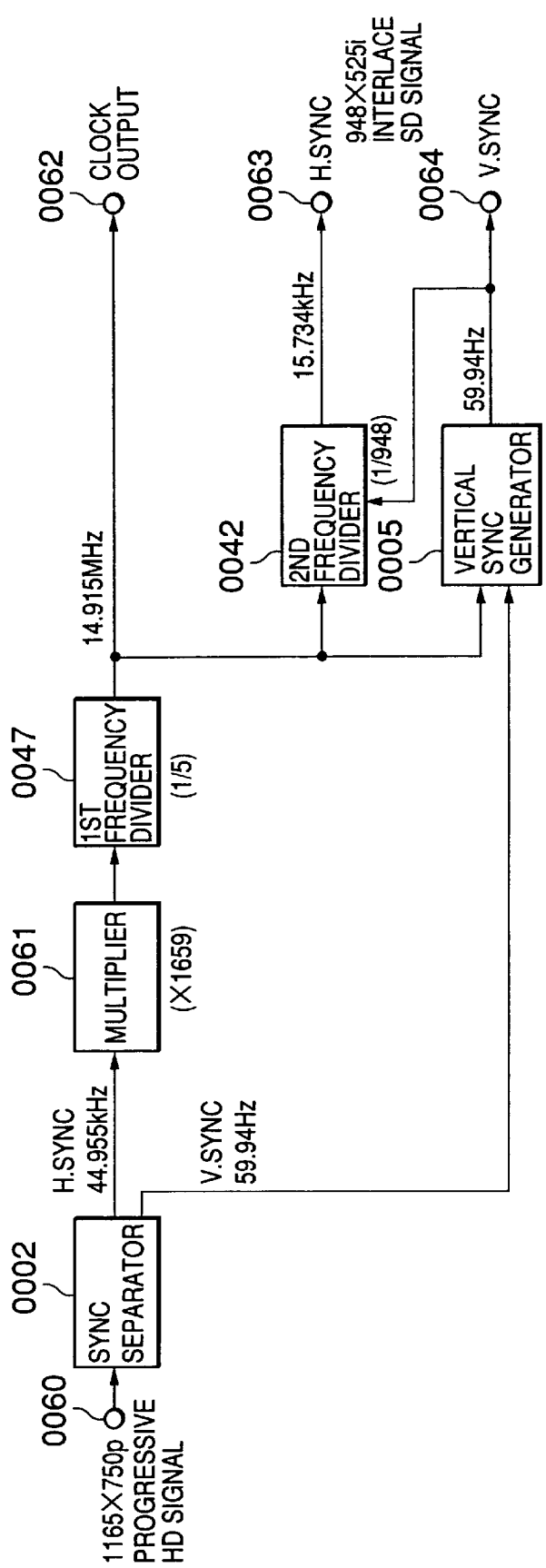
FIG. 10 is a circuit diagram for explaining the seventh embodiment of the present invention.

The seventh embodiment of the preset invention is shown in the circuit diagram of FIG. 10. In this embodiment, the format is converted from that of the HD format progressive scanning signal into that of the SD format interlace scanning signal. Here, the same components as those as shown in other embodiments are assigned with same marks and those explanations are omitted.

The progressive scanning signal comprising 750 scanning lines, 1650 pixels, and 59.94 Hz field frequency input from the input terminal 0060 is supplied to the sync separator 0002. In the sync separator 0002, the horizontal synchronizing signal and the vertical synchronizing signal separated from the input video signal. The horizontal synchronizing signal for 44.955 KHz separated from the video signal in the sync separator 0002 is supplied to the vertical synchronizing signal generator 0005 via the multiplier 0061 and the first frequency divider 0047. The vertical synchronizing signal for 59.94 Hz separated from the video signal in the sync separator 0002 is also supplied to the vertical synchronizing signal generator 0005.

In the multiplier 0061, the horizontal synchronizing signal for 44.955 KHz is multiplied by a factor of 1659. In the first frequency divider, the clock of 14.915 MHz is generated by dividing by a factor of 5 the frequency of the output from the multiplier 0061, and output to the frequency divider 0042 and the output terminal 0062.

In the vertical synchronizing signal generator 0005, the vertical synchronizing signal corresponding to the signal format after the conversion is generated based on the vertical synchronizing signal output from the sync separator 0002 and the signal obtained in the first frequency divider 0047, and output to the frequency divider 0042 and the output terminal 0064.

In the second frequency divider 0042, the horizontal synchronizing signal for 15.734 KHz corresponding to the signal format after the conversion by dividing by a factor of 948 the frequency of the clock output from the first frequency divider 0047, and output to the output terminal 0063. Accordingly, the horizontal synchronizing signal previously multiplied by a factor of 1659/5 is divided by a factor of 4740 through a combination of the first frequency divider 0047 and the second frequency divider 0042 to finally result the progressive scanning signal comprising 525 scanning lines.

As described above, by using the clock which is multiplied by a factor of 1659/5 the horizontal synchronizing signal for the HD format progressive scanning signal into the multiplier 0081 and the first frequency divider 0047, the horizontal and the vertical synchronizing signals of the SD format interlace scanning signal are generated without changing the standard number of the scanning lines and the field frequency.

(Eighth Embodiment)

Figure 11:
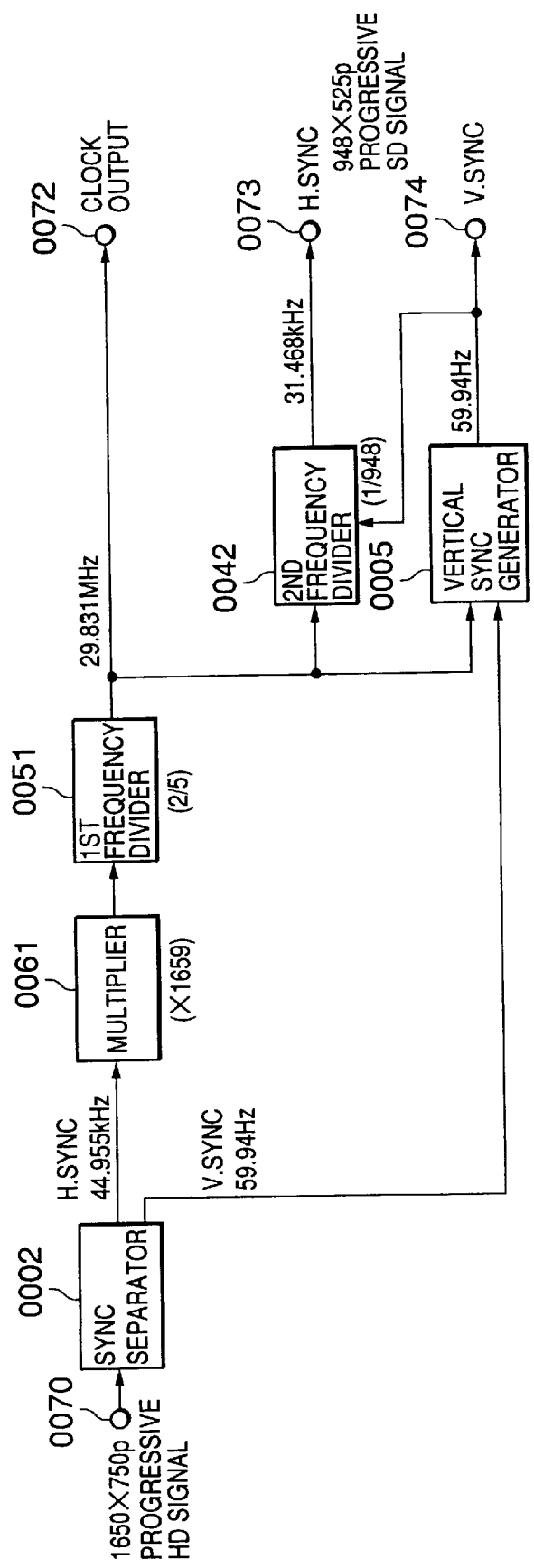
FIG. 11 is a circuit diagram for explaining the eighth embodiment of the present invention.

FIG. 11 shows the circuit diagram for explaining the embodiment of the present invention. In this embodiment, the format is converted from that of the HD format progressive scanning signal into that of the SD format progressive scanning signal. Here, the same components as those as shown in other embodiments are assigned with same marks, and those explanations are omitted.

The progressive scanning signal comprising 750 scanning lines, 1650 pixels, and 59.94 Hz field frequency input from the input terminal 0070 is supplied to the sync separator 0002. In the sync separator 0002 the horizontal synchronizing signal and the vertical synchronizing signal are separated from the input video signal. The horizontal synchronizing signal for 44.955 KHz separated from the sync separator 0002 is supplied to the vertical synchronizing signal generator 0005 via the multiplier 0061 and the first frequency divider 0051. The vertical synchronizing signal separated from the video signal in the sync separator 0002 is also supplied to the vertical synchronizing signal generator 0005.

In the multiplier 0061, the horizontal synchronizing signal for 44.955 KHz is multiplied by a factor of 1659. In the first frequency divider 0051, the clock of the 29.831 MHz is generated by dividing by a factor of 5/2 the frequency of the output from the multiplier 0061, and output to the frequency divider 0042 and the output terminal 0072.

In the vertical synchronizing signal generator 0005, the vertical synchronizing signal corresponding to the signal format after the conversion is generated based on the vertical synchronizing signal output from the sync separator 0002 and the signal obtained in the first frequency divider 0051, and output to the second frequency divider 0042 and the output terminal 0074.

In the second frequency divider 0042, the horizontal synchronizing signal for 31.468 MHz corresponding to the signal format after the conversion is generated by dividing the frequency of the clock output from the first frequency divider 0051 based on the signal output from the vertical synchronizing signal generator 0005, and output to the output terminal 0073. Accordingly, the horizontal synchronizing signal previously multiplied by a factor of 1659 is divided by a factor of 2370 through a combination of the first frequency divider 0051 and the second frequency divider 0042 to finally result the progressive scanning signal comprising 525 scanning lines.

As described above, by using the clock generated by multiplying by a factor of 3318/5 the horizontal synchronizing signal for the HD format progressive scanning signal in the multiplier 0061 and the first frequency divider 0051, the horizontal and the vertical synchronizing signals of the SD format progressive scanning signal are generated without changing the standard number of the scanning lines and the field frequency.

As explained in fifth through eight embodiment of the present invention, in the case of the format conversion from that of the HD format signal into that of the SD format signal, the horizontal synchronizing signal for the SD format signal is generated by dividing by a factor of 948 the frequency of the signal obtained by multiplying the horizontal synchronizing signal for the HD format signal, even though the number of the scanning lines is different from before and after the conversion of the signal format, and the factor of multiplying the horizontal synchronizing signal for the HD format signal in the scanning system is also different.

Here, in the first through eighth embodiments of the present invention, the case that the field frequency is 59.94 Hz is explained. However, the field frequency of 60 Hz may be applied at the same configuration.

As described above, the present invention can provide an extremely preferable clock frequency generator to generate the clock of a unified frequency in order to obtain the horizontal and the vertical synchronizing signals for the video signal after the format conversion without changing the field frequency and the scanning lines of the standard video signal, in the case of the format conversion from that of the video signal in the television receiver.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A clock frequency generator for a television receiver capable of converting a signal format from that of an interlace scanning signal comprising 525 scanning lines into that comprising 1125 scanning lines, comprising:
   a multiplier for multiplying by a factor of 4740 a horizontal synchronizing signal for the interlace scanning signal comprising 525 scanning lines;
   a frequency divider for dividing by a factor of 2212 the frequency of the signal obtained in the multiplier, in order to obtain a horizontal synchronizing signal for the interlace scanning signal comprising 1125 scanning lines; and
   a clock generator for generating a clock which is used for generating the horizontal and the vertical synchronizing signals for the interlace scanning signal comprising 1125 scanning lines from the horizontal synchronizing signal for the interlace scanning signal comprising 525 scanning lines in the multiplier.

2. A clock frequency generator, as claimed in claim 1, the multiplier comprises;
   a first multiplier for multiplying by a factor of 948 a horizontal synchronizing signal for the interlace scanning signal comprising 525 scanning lines; and
   a second multiplier for further multiplying by a factor of 5 the frequency of the signal obtained in the first multiplier.

3. A clock frequency generator, as claimed in claim 2, further comprises:
   a vertical synchronizing signal generator for generating a vertical synchronizing signal for the interlace scanning signal comprising 1125 scanning lines from a vertical synchronizing signal for the interlace scanning signal comprising 525 scanning lines and the signal obtained in the second multiplier;
   wherein, the frequency divider divides the frequency of the signal obtained in the second multiplier, based on the signal obtained in the vertical synchronizing signal generator.

4. A clock frequency generator for a television receiver capable of converting a signal format from that of an interlace scanning signal comprising 525 scanning lines into a progressive scanning signal comprising 750 scanning lines, comprising:
   a multiplier for multiplying by a factor of 4740 a horizontal synchronizing signal for the interlace scanning signal comprising 525 scanning lines;
   a frequency divider for dividing by a factor of 659 the frequency of the signal obtained in the multiplier, in order to obtain a horizontal synchronizing signal for the progressive scanning signal comprising 750 scanning lines; and
   a clock generator for generating a clock which is used for generating the horizontal and the vertical synchronizing signals for the progressive scanning signal comprising 750 scanning lines from the horizontal synchronizing signal for the interlace scanning signal comprising 525 scanning lines in the multiplier.

5. A clock frequency generator, as claimed in claim 4, the multiplier comprises;
   a first multiplier for multiplying by a factor of 948 a horizontal synchronizing signal for the interlace scanning signal comprising 525 scanning lines; and
   a second multiplier for further multiplying by a factor of 5 the frequency of the signal obtained in the first multiplier.

6. A clock frequency generator, as claimed in claim 5, further comprises:
   a vertical synchronizing signal generator for generating a vertical synchronizing signal for the progressive scanning signal comprising 750 scanning lines from a vertical synchronizing signal for the interlace scanning signal comprising 525 scanning lines and the signal obtained in the second multiplier;
   wherein, the frequency divider divides the frequency of the signal obtained in the second multiplier, based on the signal obtained in the vertical synchronizing signal generator.

7. A clock frequency generator for a television receiver capable of converting a signal format from that of a progressive scanning signal comprising 525 scanning lines into an interlace scanning signal comprising 1125 scanning lines, comprising:
   a multiplier for multiplying by a factor of 2370 a horizontal synchronizing signal for the progressive scanning signal comprising 525 scanning lines;
   a vertical synchronizing signal generator for generating a vertical synchronizing signal for the interlace scanning signal comprising 1125 scanning lines from a vertical synchronizing signal for the progressive scanning signal comprising 525 scanning lines and the signal obtained in the multiplier;
   a frequency divider for dividing by a factor of 2212 the frequency of the signal obtained in the multiplier, in order to obtain a horizontal synchronizing signal for the interlace scanning signal comprising 1125 scanning lines; and
   a clock generator for generating a clock which is used for generating the horizontal and the vertical synchronizing signals for the interlace scanning signal comprising 1125 scanning lines from the horizontal synchronizing signal for the progressive scanning signal comprising 525 scanning lines in the multiplier.

8. A clock frequency generator, as claimed in claim 7, wherein the multiplier comprises:
   a first multiplier for multiplying by a factor of 948 a horizontal synchronizing signal for the progressive scanning signal comprising 525 scanning lines; and
   a second multiplier for further multiplying by a factor of 5/2 the frequency of the signal obtained in the first multiplier.

9. A clock frequency generator, as claimed in claim 8, wherein:
   a vertical synchronizing signal generator for generating a vertical synchronizing signal for the interlace scanning signal comprising 1125 scanning lines from a vertical synchronizing signal for the progressive scanning signal comprising 525 scanning lines and the signal obtained in the second multiplier; and the frequency divider divides the frequency of the signal obtained in the second multiplier, based on the signal obtained in the vertical synchronizing signal generator.

10. A clock frequency generator for a television receiver capable of converting a signal format from that of a progressive scanning signal comprising 525 scanning lines into that of 750 scanning lines, comprising:

a multiplier for multiplying by a factor of 2370 a horizontal synchronizing signal for the progressive scanning signal comprising 525 scanning lines;

a frequency divider for dividing by a factor of 1659 the frequency of the signal obtained in the multiplier, in order to obtain a horizontal synchronizing signal for the progressive scanning signal comprising 750 scanning lines; and a clock generator for generating a clock which is used for generating the horizontal and the vertical synchronizing signals for the progressive scanning signal comprising 750 scanning lines from the horizontal synchronizing signal for the progressive scanning signal comprising 525 scanning lines in the multiplier.

11. A clock frequency generator, as claimed in claim 10, wherein the multiplier comprises:

a first multiplier for multiplying by a factor of 948 a horizontal synchronizing signal for the progressive scanning signal comprising 525 scanning lines; and a second multiplier for further multiplying by a factor of 5/2 the frequency of the signal obtained in the first multiplier.

12. A clock frequency generator, as claimed in claim 11, further comprises:

a vertical synchronizing signal generator for generating a vertical synchronizing signal for the progressive scanning signal comprising 750 scanning lines from a vertical synchronizing signal for the progressive scanning signal comprising 525 scanning lines and the signal obtained in the second multiplier;

wherein, the frequency divider divides the frequency of the signal obtained in the second multiplier, based on the signal obtained in the vertical synchronizing signal generator.

13. A clock frequency generator for a television receiver capable of converting a signal format from that of an interlace scanning signal comprising 525 scanning lines into that comprising 1125 scanning lines, comprising:

a multiplier for multiplying by a factor of 2212 a horizontal synchronizing signal for the interlace scanning signal comprising 1125 scanning lines;

a frequency divider for dividing by a factor of 4740 the frequency of the signal obtained in the multiplier in order to obtain a horizontal synchronizing signal for the interlace scanning signal comprising 525 scanning lines; and a clock generator for generating a clock which is used for generating the horizontal and the vertical synchronizing signals for the interlace scanning signal comprising 525 scanning lines from the horizontal synchronizing signal for the interlace scanning signal comprising 1125 scanning lines in the frequency divider.

14. A clock frequency generator, as claimed in claim 13, the frequency divider comprises;

a first frequency divider for dividing by a factor of 5 the frequency of the signal obtained in the multiplier; and a second frequency divider for dividing by a factor of 948 the frequency of the signal obtained in the first frequency divider in order to obtain a horizontal synchronizing signal for the interlace scanning signal comprising 525 scanning lines.

15. A clock frequency generator, as claimed in claim 13, further comprises:

a vertical synchronizing signal generator for generating a vertical synchronizing signal for the interlace scanning signal comprising 525 scanning lines from the vertical synchronizing signal for the interlace scanning signal comprising 1125 scanning lines and the signal obtained in the multiplier;

wherein, the frequency divider divides the frequency of the signal obtained in the second multiplier, based on the signal obtained in the vertical synchronizing signal generator.

16. A clock frequency generator for a television receiver capable of converting a signal format from that of a progressive scanning signal comprising 525 scanning lines into an interlace scanning signal comprising 525 scanning lines, comprising:

a multiplier for multiplying by a factor of 2212 a horizontal synchronizing signal for the interlace scanning signal comprising 1125 scanning lines;

a first frequency divider for dividing by a factor of 5/2 the frequency of the signal obtained in the multiplier;

a second frequency divider for further dividing by a factor of 948 the frequency of the signal obtained in the first frequency divider in order to obtain a horizontal synchronizing signal for the progressive scanning signal comprising 525 scanning lines; and a clock generator for generating a clock which is used for generating the horizontal and the vertical synchronizing signals for the progressive scanning signal comprising 525 scanning lines from the horizontal synchronizing signal for the interlace scanning signal comprising 1125 scanning lines in the first frequency divider.

17. A clock frequency generator, as claimed in claim 16, the frequency divider comprises;

a first frequency divider for dividing by a factor of 5/2 the frequency of the signal obtained in the multiplier; and a second frequency divider for dividing by a factor of 948 the frequency of the signal obtained in the first frequency divider in order to obtain a horizontal synchronizing signal for the progressive scanning signal comprising 525 scanning lines.

18. A clock frequency generator, as claimed in claim 17, further comprises:

a vertical synchronizing signal generator for generating a vertical synchronizing signal for the progressive scanning signal comprising 525 scanning lines from the vertical synchronizing signal for the interlace scanning signal comprising 1125 scanning lines and the signal obtained in the multiplier;

wherein, the second frequency divider divides the frequency of the signal obtained in the second multiplier, based on the signal obtained in the vertical synchronizing signal generator.

19. A clock frequency generator for a television receiver capable of converting a signal format from that of a progressive scanning signal comprising 750 scanning lines into a interlace scanning signal of the 525 scanning lines, comprising:

a multiplier for multiplying by a factor of 1659/5 a horizontal synchronizing signal for the progressive scanning signal comprising 750 scanning lines;

a frequency divider for dividing by a factor of 4740 the frequency of the signal obtained in the multiplier in order to obtain a horizontal synchronizing signal for the interlace scanning signal comprising 525 scanning lines; and a clock generator for generating a clock which is used for generating the horizontal and the vertical synchronizing signals for the interlace scanning signal comprising 525 scanning lines from the horizontal synchronizing signal for the interlace scanning signal comprising 750 scanning lines in the frequency divider.

20. A clock frequency generator, as claimed in claim 19, the frequency divider comprises;

a first frequency divider for dividing by a factor of 5 the frequency of the signal obtained in the multiplier; and a second frequency divider for dividing by a factor of 948 the frequency of the signal obtained in the first frequency divider in order to obtain a horizontal synchronizing signal for the interlace scanning signal comprising 525 scanning lines.

21. A clock frequency generator, as claimed in claim 20, further comprises:

a vertical synchronizing signal generator for generating a vertical synchronizing signal for the interlace scanning signal comprising 525 scanning lines from the vertical synchronizing signal for the progressive scanning signal comprising 750 scanning lines and the signal obtained in the multiplier;

wherein, the second frequency divider divides the frequency of the signal obtained in the second multiplier, based on the signal obtained in the vertical synchronizing signal generator.

22. A clock frequency generator for a television receiver capable of converting a signal format from that of a progressive scanning signal comprising 750 scanning lines into that comprising 525 scanning lines, comprising:

a multiplier for multiplying by a factor of 1659 a horizontal synchronizing signal for the progressive scanning signal comprising 750 scanning lines;

a frequency divider for dividing by a factor of 2370 the frequency of the signal obtained in the multiplier in order to obtain a horizontal synchronizing signal for the progressive scanning signal comprising 525 scanning lines; and a clock generator for generating a clock which is used for generating the horizontal and the vertical synchronizing signals for the progressive scanning signal comprising 525 scanning lines from the horizontal synchronizing signal for the progressive scanning signal comprising 750 scanning lines in the frequency divider.

23. A clock frequency generator, as claimed in claim 22, the frequency divider comprises;

a first frequency divider for dividing by a factor of 5/2 the frequency of the signal obtained in the multiplier; and a second frequency divider for dividing by a factor of 948 the frequency of the signal obtained in the first frequency divider in order to obtain a horizontal synchronizing signal for the progressive scanning signal comprising 525 scanning lines.

24. A clock frequency generator, as claimed in claim 23, further comprises:

a vertical synchronizing signal generator for generating a vertical synchronizing signal for the progressive scanning signal comprising 525 scanning lines from the vertical synchronizing signal for the progressive scanning signal comprising 750 scanning lines and the signal obtained in the multiplier;

wherein, the second frequency divider divides the frequency of the signal obtained in the second multiplier, based on the signal obtained in the vertical synchronizing signal generator.

\* \* \* \* \*